United States Patent

Fehr, Jr. et al.

[15] 3,649,304

[45] Mar. 14, 1972

[54] REFRIGERATED SOLID BATTER

[72] Inventors: Issac N. Fehr, Jr.; Trebor B. Morris; John J. Russ; Richard C. Bingham; Jose M. Rubi; James C. Patton; Sidney E. Cannon, all of Dallas, Tex.

[73] Assignee: Campbell Taggart, Inc., Dallas, Tex.

[22] Filed: Sept. 6, 1968

[21] Appl. No.: 757,993

[52] U.S. Cl. .......................... 99/192 BB, 99/86, 99/90 NF, 99/92
[51] Int. Cl. .......................... A21d 13/08, A21d 8/00
[58] Field of Search ............ 99/92, 86, 90 NF, 192 R, 192 BB

[56] References Cited

UNITED STATES PATENTS 3,166,426  1/1965  Matz et al. .......................... 99/192
3,433,646  3/1969  Savre et al. .......................... 99/92

Primary Examiner—Raymond N. Jones
Assistant Examiner—James R. Hoffman
Attorney—Howard E. Moore

[57] ABSTRACT

A refrigerated solid batter for making flour based products, such as cakes, cookies, muffins, bread and the like, and the process for making same generally consisting of mixing gelatin or other stabilizing agent of similar characteristics with fluid and dry ingredients to which is added chemical leaveners, such as a basic and an acid leavener, mixing same in liquid state before solidification of the stabilizer, sealing the batter in a container and refrigerating the same at a temperature below the melting point of the stabilizer to solidify same for marketing same as a refrigerated product.

15 Claims, 1 Drawing Figure

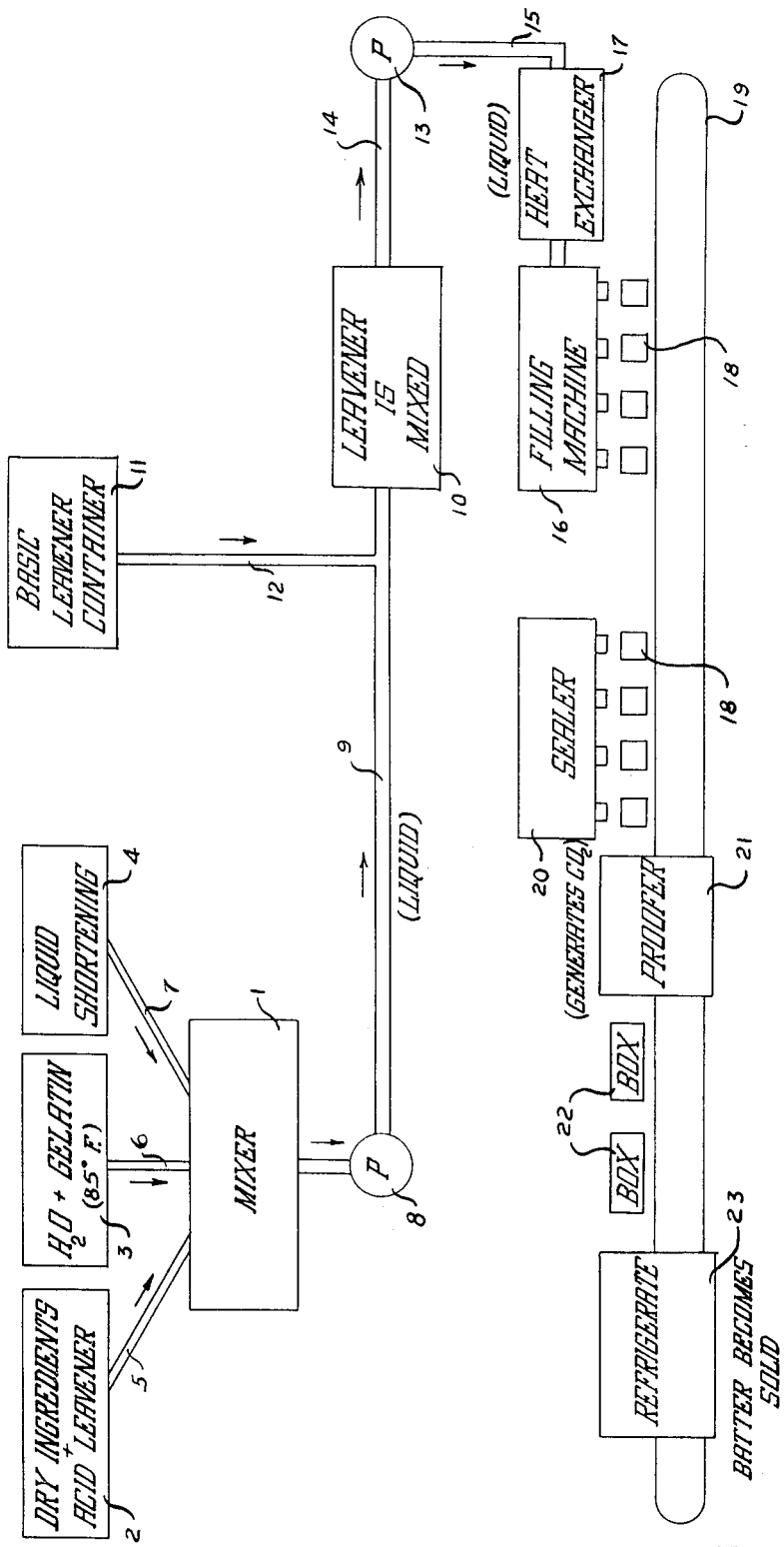

3,649,304

REFRIGERATED SOLID BATTER

BACKGROUND OF THE INVENTION

Packaged dry mixes for making bread, pancakes, cakes, cookies and other like food products have become very popular by reason of the convenience afforded the housewife in preparation and cooking such products. These convenience products have all the ingredients therein necessary to the cooking or baking of the finished product with the exception of the fluid such as milk or water, and in many instances fresh eggs must be added thereto and the product stirred and mixed in suitable form for grilling or baking. In the case of rolls or biscuits the dough must be rolled out and cut before placing it in the pan and in the case of cake the batter must be beat for a predetermined period, either by hand or by mechanical mixer, thus requiring a considerable amount of time and effort and the cleaning up of kitchen utensils, such as mixing bowls, spoons, beaters, mixers, etc., after the preparation of the product, which results in considerable effort and inconvenience on the part of the housewife.

No satisfactory means has heretofore been provided for stabilizing premixed cake batter to give it commercial value. In the process and product hereinafter described premixed cake batter is solidified with a reversible stabilizing agent to achieve bacteriological, chemical and physical stability to provide a prepared, packaged, ready-to-cook batter which may be preserved for a prolonged period of time and when cooked provides a product of good texture and palatability.

DESCRIPTION OF THE INVENTION

The invention hereinafter described provides a prepared convenience product of the type hereinbefore indicated which overcomes the inconvenience and shortcomings of presently marketed ready-mixed dry mix material, which results in a saving of time and inconvenience by the user.

The invention described herein provides a solid refrigerated batter which may be marketed in appropriate packages from the refrigerator counter in grocery stores, such as cans or boxes, and may be adapted for making a variety of prepared food products, such as layer cakes, cupcakes, hot breads (muffins, biscuits, hush puppies, spoon bread (corn bread), gingerbread), pancake and waffle mixes, cookies, brownies, puddings and other products of like nature.

Generally, it consists of a ready-to-cook batter solidified with gelatin or other congealing agents, such as plant gelatin (agar-agar), cellulose derivatives, sodium alginate, or gums of various kinds. It has been found from experiments that animal gelatin is the most satisfactory stabilizer in that it is more convenient to incorporate same in the mixture in the process of making same, provides a product of a desired consistency for handling and preparation for baking and has superior preservative qualities. However, it is not intended to exclude other congealing agents, such as mentioned above, which are liquid at higher temperatures and congealed at lowered temperatures.

Generally the process for making the solidified batter is as follows:

1. The preparation of a water-gelatin solution at a temperature above the melting point of the gelatin, which is normally about 80° Fahrenheit.

2. The dry ingredients of the mixture are prepared to which is added a leavening acid, such as an acid sodium aluminum phosphate based product, a suitable form of which is that marketed under the name of "Pan-O-Lite" by Monsanto Company. Other types of acid leaveners, such as potassium hydrogen tartrate (cream of tartar) tartaric acid, calcium dihydrogen phosphate (monobasic calcium phosphate) and sodium acid pyrophosphate could be used. The dry mix with the leavening acid are thoroughly mixed.

3. The water-stabilizer solution is added to the dry ingredients and acid leavener mixture and is thoroughly mixed therewith.

4. The addition to the mixture of a basic leavener, such as sodium bicarbonate. Upon further mixing the basic and acid leaveners react to produce carbon dioxide ($CO_2$) which displaces oxygen in the batter and delays spoilage and chemical deterioration.

5. During mixing the batter mixture is maintained at a temperature such as to keep the gelatin or other stabilizer in solution and in liquid state until it is deposited into suitable containers. Normally in static condition, gelatin in solution will congeal at about 80° Fahrenheit, but while being agitated will remain in solution at a lower temperature. In order to secure optimum emulsification and aeration for leavened cake batter it is desirable that the temperature of the mixture be maintained at a temperature of 70°–74° Fahrenheit.

Suitable material for the container may be tin, plastic, aluminum or cardboard, and may assume the desired shape and size for the particular product. For instance, biscuit, roll, muffin or cookie batter may be packaged in cylindrical easy-open containers similar to those in which prepared biscuits are now marketed, and cake batter may be packaged in suitable containers to receive individual layers of batter so that one or plurality of layers may be selectively purchased and used. However, it is suggested that the product be packaged and sealed in some airtight material such as plastic or metal, because deterioration of the product results from admission of oxygen to the container.

After depositing the liquid batter in the container and same is sealed therein, reaction between the basic and acid leaveners continues to produce carbon dioxide inside the sealed containers until the internal pressure in the container diminishes the rate of reaction.

6. The filled containers are then refrigerated. When the mixture becomes static and the temperature thereof is below the congealing point of the stabilizer used (which is 80° Fahrenheit for gelatin), the liquid batter becomes solid, virtually stopping the reaction between the basic-acidic leaveners. As long as the batter is maintained below the congealing point of the stabilizer it remains in a thick, gelatinlike, solidified form and very little reaction takes place between the basic-acidic leaveners.

The product is retained in the refrigerator counter at the grocery store at a temperature below the congealing point of the stabilizer and preferably above the freezing point. However, it has been found that the product can be frozen without changing the useable characteristic thereof. It has been found that approximately 50° Fahrenheit is a desirable storage temperature.

The refrigerated solid batter may be purchased by the housewife or other intended user, taken to the home and stored in the refrigerator for a prolonged period of time before use.

When it is desired to use the product the container may be opened and the product prepared for baking or grilling. In the case of biscuits, muffins, rolls or cookies the solidified batter will be removed from the container, sliced into disclike sections and placed in muffin tins or on a baking sheet and simply placed in an oven heated to baking temperature for the particular product; or in the case of cake batter the individual layers may be placed in cake pans and placed in the oven heated to the desired baking temperature; and in the case of pancake or waffle batter the batter packaged and formed in suitable shape may be placed on a heated griddle or waffle iron which is heated to a desired temperature.

When the temperature to which the solid batter is exposed reaches the melting point of the stabilizer, the batter melts and again assumes a liquid state, and the acidic-basic leavener reaction resumes to proof the product as $CO_2$ is formed therein to expand same and drive oxygen therefrom until the final point of baking or otherwise cooking is reached.

The solid batter product makes possible the production of a stable, convenient, easy-to-form, easy-to-package, handle and prepare batter for final baking with a minimum of time and effort which may be employed for making a variety of baked or grilled bread and cake products and conveniently marketed through grocery stores and other retail outlets. No mixing or other processing needs to be carried out when the product is unpackaged for cooking, in that the package is simply opened and the solid batter is placed in a suitable container or directly on the grill for baking or otherwise cooking.

The product hereinafter described in detail has been found to have a minimum of nine weeks of shelf life for nonsweet products, and in the case of sweet products, the additional factor of a sugar-water ratio of 1 to 4 in the lower limit and 2 to 1 in the upper limit further increases the shelf life of the product for over 15 weeks when stored at a temperature of 50° Fahrenheit or less. If frozen the product will be preserved for a much longer length of time. The only limiting factor is chemical deterioration caused by oxygen remaining in the container.

Other and further objects of the invention will become apparent upon reading the detailed specification hereinafter following and by referring to the drawing annexed hereto.

DESCRIPTION OF THE DRAWING

A suitable apparatus for practicing the invention is shown schematically in the attached drawing.

DESCRIPTION OF THE PROCESS AND PRODUCT

In the drawing the numeral 1 indicates a mixer which has an agitator therein. The dry ingredients of the particular product are mixed in a suitable container. The dry ingredients usually consists of flour or corn meal to which is added flavoring material and acid leavener in appropriate proportions in a manner well known in the art. Gelatin or other stabilizer material is mixed in the container 3 with water to provide a fluid mixture. Liquid shortening is provided in the container 4, if required in the particular recipe. Typical recipes suitable for use in the practice of the process and the manufacture of the product will be set forth hereinafter.

The ingredients from the separate containers 2, 3 and 4 are fed into the mixer 1 through appropriate supply lines 5, 6 and 7 where they are thoroughly agitated and mixed together. It will be noted that the temperature of the mixture is maintained at this point above the melting point of the gelatin or other stabilizer media while being agitated. The melting point of solidified gelatin is normally 80° Fahrenheit, but remains in solution while being agitated at lower temperatures. For best aeration and emulsification it is recommended that the temperature during mixing be maintained at about 70°–74° Fahrenheit, but in any event the temperature should be maintained above the melting point of the stabilized agent employed while being mixed. Suitable means such as heat exchangers or cooling coils in or about the mixing containers and conduits may be provided to maintain the optimum temperature.

The mixture in container 1 is transferred by an appropriate pump 8 through a line 9 through the leavener mixer 10. The leavener mixer 10 may have an appropriate agitator blade or spiral collator mixer therein. The basic leavener (sodium bicarbonate in solution) is metered into the line 9 to join with the mixture passing therethrough from a leavener container 11 through a line 12. The basic leavener is added to and mixed with the initial mixture after it is prepared because the addition of the basic leavener initiates the quick reaction between the basic leavener and acidic leavener to form carbon dioxide and thereby expand the mixture just prior to packaging. This tends to displace oxygen in the batter. Oxygen left in the product will cause discoloration and chemical deterioration after packaging and decrease the effective shelf life of the product. The basic leavener is thoroughly incorporated and mixed with the initial mix by an appropriate agitator in the mixer container 10 while the temperature is maintained within the range mentioned above and is withdrawn therefrom by a pump 13 through a line 14 and is transferred through line 15 to a conventional filling machine 16. Preferably a heat exchanger 17 is disposed about line 15 to maintain the temperature of the batter below the congealing point of the stabilizer to thicken the batter and slow up reaction before packaging. From line 15 the batter is deposited in appropriate containers, such as cans 18, carried on a conveyor 19. Container 18, after being filled is carried along the conveyor 19 to the conventional sealer 20 where they are closed and sealed with the batter mix therein. Sealing the container seals the $CO_2$ in and excludes oxygen thereby protecting it against spoilage.

Normally sufficient proofing takes place prior to packaging. However, with some recipes additional proofing may be desirable after sealing the product in the container, and in such event the containers may be passed through a proofer area 21 which is a closed area wherein the temperature has been raised from 80°–150° Fahrenheit or higher. The warmer temperature causes a more rapid reaction between the basic leavener and the acidic leavener to generate $CO_2$ in the batter, thereby increasing the pressure within the container and permeating the batter with $CO_2$ which acts as a preservative to delay spoilage of the batter. The containers may remain in the proofer area for sufficient time to proof the particular product and they are then conveyed on the conveyor 19 to an area where they are packed in boxes or other appropriate containers 22. The containers 22 are then conveyed to a refrigerated enclosure 23 wherein the temperature is lowered to as low as 32° Fahrenheit or lower. When the temperature within the batter has been lowered below the congealing point of the stabilizer, the batter will begin to congeal and solidify and finally will become congealed and solidified in thick gelatinlike, solidified form at which time the combination of the pressure within the container and the solidification of the batter will virtually stop the reaction between the basic leavener and the acid leavener so that the product is stabilized in such state with carbon dioxide permeating same to delay spoilage.

As long as the product is retained in the refrigerated state at a temperature below the congealing point of the gelatin stabilizer it will remain in solidified state. The product may be refrigerated at any temperature from below freezing and 80° Fahrenheit. However, it is preferable that it be refrigerated at a temperature below 50° Fahrenheit.

Of course, the packaging of the product varies. For instance, it could be deposited in appropriate pans or box containers which are sealed by appropriate mechanical means prior to refrigeration.

The product may be withdrawn from the refrigerated storage area 23 and transported by refrigerated vehicles to stores and other distribution outlets and placed in the refrigerated counter therein where it is maintained at the appropriate refrigerated temperature to retain same in solidified state until it is bought by the consumer who may in turn take it to his home and refrigerate same in the home refrigerator until desired to be used.

If maintained in refrigerated state the products will be preserved for protracted length of time, which in the case of bread products may be nine weeks or more and in the case of cake, cookie and muffin batter wherein sugar is added the shelf life may be additionally prolonged to as much as fifteen weeks or more due to the fact that the sugar is an added preservative.

The product may be conveniently used by simply opening the package in which it is confined, removing it therefrom in solidified state, and placing it in appropriate cooking containers in an oven heated to baking temperature, or in the case of pancake and waffle batter it may be deposited directly upon the griddle. Upon being subjected to a temperature above the melting point of the stabilizer agent, such as gelatin, the product resumes a liquid state at which time the basic-acidic leavener reaction resumes to form carbon dioxide therein, expand the same, and again become solidified in cooked or baked state so that the product goes through a cycle of liquid, solidification, liquid and finally solidification.

Since no preparation, such as adding eggs or fluid thereto, as in the case of packaged dry mix, is necessary the product may be much more quickly and conveniently prepared for final cooking than dry-mix preparations now on the market. By way of comparison it takes five minutes or less to prepare the solidified batter for cooking whereas it takes fifteen minutes or more to mix and prepare the normal dry mix for cooking, not to mention the saving in time in not being required to wash and clean cooking utensils required for preparation and cooking of dry-mix preparations.

The percentage of gelatin to liquid may vary from 2 to 8 percent. Under 2 percent the gelatin will not sufficiently solidify the product and over 8 percent the solidified product will be overly tough. It has been found from experiment that the optimum percentage of gelatin to liquid is 4 percent for all products for best results.

It has been found that excessive agitation of the material in mixing is not desirable because such agitation raises the temperature thereof and that the solid batter mix does not tolerate a broad temperature variation during mixing for best aeration and emulsification. The mixing speed should be between 120–150 r.p.m. It is desirable that the temperature of the mix be maintained at a relatively constant level during the process of mixing and prior to packaging so that the reaction between the basic and acid leaveners will be controlled and so that there will not be excessive expansion of the material to form gas pockets therein prior to packaging same in a pressure container, and in order to provide a consistently good textured product upon baking or otherwise cooking same.

The solid batter product may be frozen to a temperature of about 10° Fahrenheit or below and retained in such state for an indefinite length of time, and upon opening same it has been found that the product may be sliced or otherwise prepared for cooking without prethawing and may be immediately placed in the oven or on the griddle in frozen state for cooking in the manner hereinbefore described; or it may be allowed to thaw to a temperature above freezing but below the congealing point of the stabilizer therein prior to preparation for cooking. It was found that by reason of the gelatin, sugar and shortening content of the batter, when frozen, it assumes a flexible consistency something like ice cream and is easily sliced in frozen state. However, due to the high level of water and the low level of fat, it has been determined that corn bread mix is preferably not frozen because it is too hard when frozen.

Various prepared ready-to-cook products may be made in accordance with the method herein disclosed, which can include all chemically leavened bread and cake products.

Typical examples of recipes of refrigerated solid batter products are set forth as follows:

SOLID BATTER YELLOW CAKE

| | Weight in Grams | Mixing Time and Speed |
|---|---|---|
| Cake Flour | 600 | |
| Emulsified Shortening | 420 | |
| Salt | 11 | |
| Granulated Sugar | 750 | |
| Nonfat Dried Milk | 24 | |
| Whole Dried Egg | 71 | 4 minutes at 120–150 r.p.m. |
| Water | 628 | |
| Dried Egg White | 30 | |
| Flavoring | 11 | |
| Bicarbonate of Soda | 11 | |
| Water | 286 | 1 minute at 120–150 r.p.m. |
| Gelatin | 37 | |
| Acid Leavener | 14 | 1 minute at 120–150 r.p.m. |

SOLID BATTER CORN BREAD

| | Weight in Grams | Mixing Time and Speed |
|---|---|---|
| Flour | 360 | |
| Corn Meal | 783 | |
| Sugar | 126 | |
| Nonfat Dried Milk | 138 | |
| Dried Whole Eggs | 36 | |
| Dried Egg White | 18 | |
| Water | 1,150 | 30 seconds at 120–150 r.p.m. |
| Salt | 18 | |
| Liquid Shortening | 189 | |
| Gelatin (Mixed with total water) | 45 | |
| Bicarbonate of Soda | 21 | |
| Acid Leavener | 27 | 30 seconds at 120–150 r.p.m. |

SOLID BATTER DEVILS FOOD CAKE

| | Weight in Grams | Mixing Time and Speed |
|---|---|---|
| Air Classified Cake Flour | 468 | 3 minutes at 120–150 r.p.m. |
| Emulsified Shortening | 369 | |
| Granulated Sugar | 948 | |
| Air Classified Cake Flour | 132 | |
| Low Fat Cocoa | 135 | |
| Salt | 27 | |
| Nonfat Dried Milk | 87 | 4 minutes at 120–150 r.p.m. |
| Dried Whole Eggs | 35 | |
| Dried Egg Whites | 54 | |
| Water | 820 | |
| Bicarbonate of Soda | 22 | |
| Flavoring | 9 | |
| Water | 487 | 1 minute at 120–150 r.p.m. |
| Gelatin | 51 | |
| Acid Leavener | 14 | 1 minute at 120–150 r.p.m. |

SOLID BATTER WHITE CAKE

| | Weight in Grams | Mixing Time and Speed |
|---|---|---|
| Air Classified Cake Flour | 480 | 2½ minutes at 120–150 r.p.m. Scrape down. |
| Emulsified Shortening | 240 | 2½ minutes at 120–150 r.p.m. scrape down. |
| Margarine | 78 | |
| Granulated Sugar | 780 | |
| Air Classified Cake Flour | 120 | |
| Salt | 22 | |
| Nonfat Dried Milk | 54 | 3 minutes at 120–150 r.p.m. |
| Dried Egg Whites | 52 | |
| Dried Whole Egg | 20 | |
| Water | 540 | |
| Bicarbonate of Soda | 18 | |
| Water | 394 | 1 minute at 120–150 r.p.m. |
| Gelatin | 36 | |
| Flavoring | 19 | |
| Acid Leavener | 22 | 1 minute at 120–150 r.p.m. |

It will be seen that we have provided a ready-to-cook refrigerated solid batter type of bread and cake mix which is adaptable for premixing and packaging various types of bread, cake and grilled bakery products which is convenient and easy to manufacture, may be preserved for prolonged periods of time and may be quickly and conveniently prepared for cooking with minimum amount of time and effort, and which results in a product of uniformly good quality.

Having described our invention, we claim:

1. A process for preparing premixed ready-to-cook batter comprising the steps of mixing dry ingredients of the mixture, including an acidic leavener and flour, with a solution of aqueous liquid containing a congealing agent thereby converting the dry ingredients to a batter; adding to the batter while mixing a basic leavener; placing the batter in a container; sealing the container before complete reaction of the leaveners; refrigerating same at a temperature below the congealing point of the congealing agent to congeal the batter; the congealing agent being in sufficient quantity to cause the batter to congeal when refrigerated below the congealing temperature of the congealing agent.

2. The method called for in claim 1 wherein the congealing agent is gelatin and the basic leavener is sodium bicarbonate.

3. The process called for in claim 2 wherein the percentage of gelatin to liquid is between 2 percent and 8 percent.

4. The method called for in claim 2 wherein the percentage of gelatin to liquid is 4 percent.

5. The process called for in claim 2 wherein the mixture is maintained at a temperature above 80° Fahrenheit while being mixed.

6. The process called for in claim 1 with the addition of liquid shortening to the mixture prior to mixing same.

7. The method called for in claim 1 wherein the temperature of the mixture is maintained at a temperature of 70°–74° Fahrenheit while being mixed.

8. The process called for in claim 1 with the addition of the step of freezing the batter in the container after being sealed therein.

9. The process called for in claim 1 with the addition of the step of heating the sealed package at a temperature of between 80° and 150° Fahrenheit before refrigerating same.

10. The process called for in claim 1 wherein the mixture is maintained at a temperature above the congealing temperature of the congealing agent while it is being mixed.

11. A process for preparing premixed ready-to-cook batter comprising the steps of mixing dry ingredients of the mixture, including an acid leavener, flour and a congealing agent with aqueous liquid thereby converting the dry ingredients to a batter; adding to the batter while mixing a basic leavener; placing the batter in a container; sealing the container before the complete reaction of the leaveners; refrigerating the batter at a temperature below the congealing point of the congealing agent to congeal the batter; the congealing agent being in sufficient quantity to cause the batter to congeal when refrigerated below the congealing temperature of the congealing agent.

12. The process called for in claim 11 wherein the mixture is maintained at a temperature of 70°–74° Fahrenheit while being mixed.

13. The process called for in claim 11 wherein the percentage of congealing agent to liquid is from 2 to 8 percent.

14. A process for preparing premixed ready-to-cook batter comprising the steps of mixing dry ingredients of the mixture, including flour, acid and basic leaveners and a congealing agent with aqueous liquid thereby converting the dry ingredients to a batter; placing the batter in a container; sealing the container before the complete reaction of the leaveners; refrigerating the batter at a temperature below the congealing point of the congealing agent to congeal the batter; the congealing agent being in sufficient quantity to cause the batter to congeal when refrigerated below the congealing temperature of the congealing agent.

15. A premixed ready-to-cook batter prepared by the process of claim 14.

* * * * *